(12) United States Patent
Luo

(10) Patent No.: US 12,262,834 B2
(45) Date of Patent: Apr. 1, 2025

(54) ELECTRIC WEIGHTED BLANKET AND METHOD FOR MANUFACTURING THE ELECTRIC WEIGHTED BLANKET

(71) Applicant: SHENZHEN STARISE CREATION TECHNOLOGY CO., LTD, Shenzhen (CN)

(72) Inventor: Qiuting Luo, Shenzhen (CN)

(73) Assignee: SHENZHEN STARISE CREATION TECHNOLOGY CO., LTD, Shenzhen (CN)

( * ) Notice: Subject to any disclaimer, the term of this patent is extended or adjusted under 35 U.S.C. 154(b) by 355 days.

(21) Appl. No.: 18/090,491

(22) Filed: Dec. 29, 2022

(65) Prior Publication Data

US 2024/0188736 A1   Jun. 13, 2024

(30) Foreign Application Priority Data

Dec. 7, 2022   (CN) .......................... 202223271163.2

(51) Int. Cl.
*A47G 9/02* (2006.01)
*H05B 3/34* (2006.01)

(52) U.S. Cl.
CPC ......... *A47G 9/0223* (2013.01); *A47G 9/0215* (2013.01); *H05B 3/342* (2013.01); *A47G 9/0207* (2013.01); *H05B 3/34* (2013.01)

(58) Field of Classification Search
CPC .. A47G 9/0223; A47G 9/0215; A47G 9/0207; H05B 3/342; H05B 3/34; A47C 21/048; A47C 21/04

USPC ...................... 5/502, 482, 421, 284; 219/217
See application file for complete search history.

(56) References Cited

U.S. PATENT DOCUMENTS

| | | | | |
|---|---|---|---|---|
| 5,835,983 A | * | 11/1998 | McMahen | H05B 3/34 392/435 |
| 6,108,581 A | * | 8/2000 | Jung | A61N 5/0625 607/98 |
| 7,319,207 B2 | * | 1/2008 | Campf | H05B 1/0272 219/211 |
| 8,604,391 B2 | * | 12/2013 | Augustine | A61B 46/27 219/545 |

(Continued)

FOREIGN PATENT DOCUMENTS

| | | | | |
|---|---|---|---|---|
| CA | 2624454 A1 | * | 4/2007 | A61B 19/08 |
| CA | 2663648 A1 | * | 3/2008 | A61B 46/00 |

(Continued)

*Primary Examiner* — Robert G Santos

(57) ABSTRACT

An electric weighted blanket includes: a blanket body, wherein the blanket body comprises a first material layer, a first weighted bead protection layer, a first weighted bead securing layer, weighted beads, a second weighted bead securing layer, a second weighted bead protection layer, a heating wire securing layer, heating wires, and a second material layer that are sequentially disposed along a vertical direction. The first material layer, the first weighted bead protection layer, the first weighted bead securing layer, the weighted beads, the second weighted bead securing layer, and the second weighted bead protection layer are connected by quilting to obtain a first component. The heating wire securing layer where the heating wires are secured and the second material layer are sewn as a second component. The first component and the second component are sewn as the blanket body.

20 Claims, 5 Drawing Sheets

(56) References Cited

U.S. PATENT DOCUMENTS

| | | | | |
|---|---|---|---|---|
| 11,633,053 | B2 * | 4/2023 | Youngblood | A61B 5/0024 |
| | | | | 62/3.5 |
| 11,765,794 | B2 * | 9/2023 | Beuckelaere | H05B 3/342 |
| | | | | 219/528 |
| 2005/0016982 | A1 * | 1/2005 | Campf | H05B 1/0272 |
| | | | | 219/211 |
| 2007/0080155 | A1 * | 4/2007 | Augustine | A61B 46/00 |
| | | | | 219/212 |
| 2011/0233185 | A1 * | 9/2011 | Augustine | A61B 46/27 |
| | | | | 219/212 |
| 2020/0171268 | A1 * | 6/2020 | Zhang | A47G 9/1036 |
| 2020/0281046 | A1 * | 9/2020 | Beuckelarere | H05B 3/36 |
| 2021/0100378 | A1 * | 4/2021 | Youngblood | A61F 7/007 |
| 2024/0188736 | A1 * | 6/2024 | Luo | H05B 3/342 |

FOREIGN PATENT DOCUMENTS

| | | | | | |
|---|---|---|---|---|---|
| EP | | 2062460 | B1 * | 3/2016 | A61B 46/00 |
| WO | WO-2007041389 | A1 * | 4/2007 | | A61B 19/08 |
| WO | WO-2008033147 | A1 * | 3/2008 | | A61B 46/00 |

* cited by examiner (a)             (b)

ELECTRIC WEIGHTED BLANKET AND METHOD FOR MANUFACTURING THE ELECTRIC WEIGHTED BLANKET

TECHNICAL FIELD

Embodiments of the present disclosure relate to the technical field of blankets, and in particular, relate to an electric weighted blanket and a method for manufacturing the electric weighted blanket.

BACKGROUND

People often use blankets to keep warm while sleeping as well as during living. In order to enhance the warming effect without changing the texture of the warming material, it is necessary to increase the thickness of the blanket, which leads to a decrease in the use comfort and a larger storage space. In order to balance the lightweight and the warming effect, electric blankets have been developed. Electric heating wires are deployed in the electric blanket to achieve an effect of rapidly generating heat and maintaining the heat. The electric blankets are often made thin. Where the electric blanket is too light and thin, sometimes a poor use experience is caused. For example, during use, the electric blanket is easily subject to displacement, failing to better cover the human body.

SUMMARY

Embodiments of the present disclosure provide an electric weighted blanket.

The electric weighted blanket includes: a blanket body, wherein the blanket body includes a first material layer, a first weighted bead protection layer, a first weighted bead securing layer, weighted beads, a second weighted bead securing layer, a second weighted bead protection layer, a heating wire securing layer, heating wires, and a second material layer that are sequentially disposed along a vertical direction; wherein
  the weighted beads are disposed between the first weighted bead securing layer and the second weighted bead securing layer;
  the first material layer, the first weighted bead protection layer, the first weighted bead securing layer, the weighted beads, the second weighted bead securing layer, and the second weighted bead protection layer are connected by quilting via first sewing threads and form a plurality of quilting regions to obtain a first component, each of the quilting regions containing one or a plurality of the weighted beads; and
  the heating wires are secured to a side, facing towards the second material layer, of the heating wire securing layer, and the heating wire securing layer where the heating wires are secured and the second material layer are sewn as a second component via second sewing threads;
  wherein the first component and the second component are sewn as the blanket body by third sewing threads.

The embodiments of the present disclosure further provide a method for manufacturing an electric weighted blanket.

The method includes:
  disposing weighted beads between a first weighted bead securing layer and a second weighted bead securing layer, and connecting a first material layer, a first weighted bead protection layer, the first weighted bead securing layer, weighted beads, the second weighted bead securing layer, and a second weighted bead protection layer by quilting via first sewing threads and forming a plurality of quilting regions to obtain a first component, each of the quilting regions containing one or a plurality of the weighted beads;
  securing the heating wires to a side, facing towards the second material layer, of the heating wire securing layer, sequentially disposing the heating wire securing layer where the heating wires are secured and the second material layer along a vertical direction, and sewing, via second sewing threads, the heating wire securing layer and the second material layer into a second component; and
  sequentially disposing the first component and the second component along the vertical direction, and sewing, via third sewing threads, the first component and the second component to obtain the electric weighted blanket.

BRIEF DESCRIPTION OF THE DRAWINGS

The accompanying drawings are merely for illustrating some exemplary embodiments, but shall not be construed as limiting the present disclosure. In all the accompanying drawings, like reference numerals denote like parts. In the drawings.

DETAILED DESCRIPTION

Some exemplary embodiments of the present disclosure are hereinafter described in detail with reference to the accompanying drawings. Although the accompanying drawings illustrate the exemplary embodiments of the present disclosure, it shall be understood that the present disclosure may be practiced in various manners, and the present disclosure shall not be limited by the embodiments illustrated herein.

Figure 1:
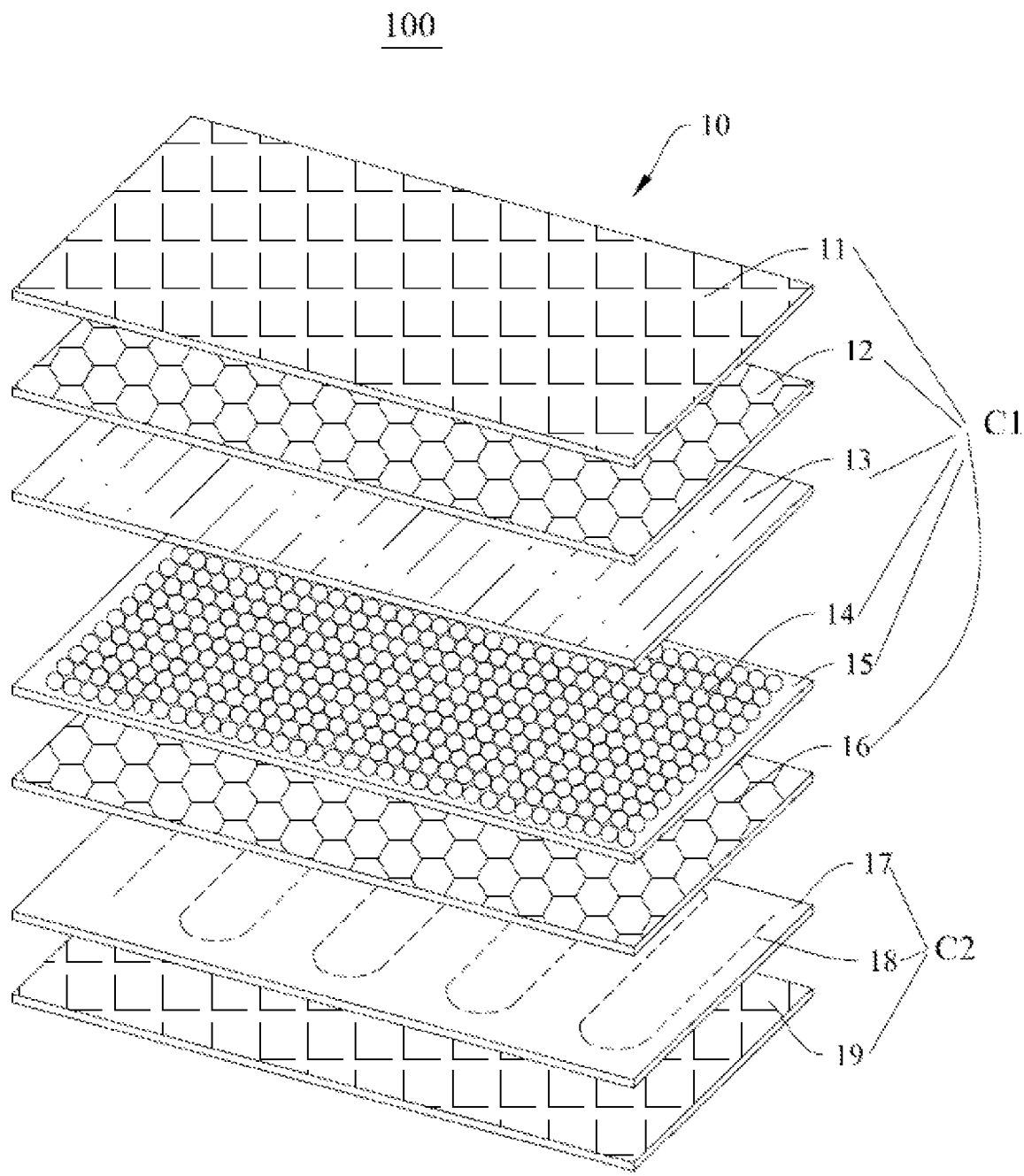
FIG. 1 is a schematic structural view of an electric weighted blanket according to an embodiment of the present disclosure.

FIG. 1 is a schematic structural view of an electric weighted blanket according to an embodiment of the present disclosure. As illustrated in FIG. 1, an electric weighted blanket 100 includes: a blanket body 10. The blanket body 10 includes a first material layer 11, a first weighted bead protection layer 12, a first weighted bead securing layer 13, weighted beads 14, a second weighted bead securing layer 15, a second weighted bead protection layer 16, a heating wire securing layer 17, heating wires 18, and a second material layer 19 that are sequentially disposed along a vertical direction.

Figure 2:
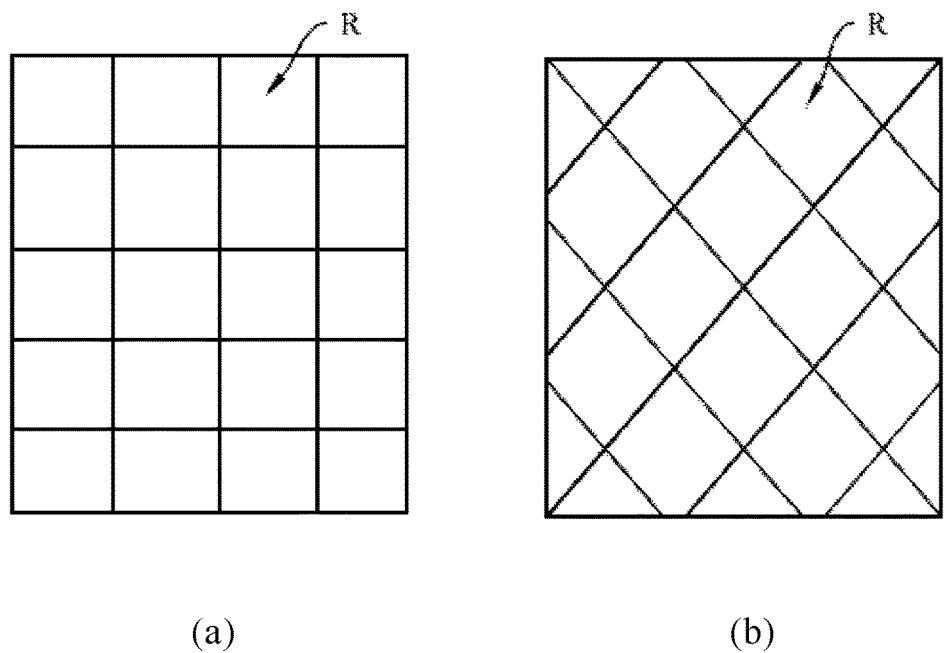
FIG. 2 is a schematic plan view of a quilting region according to an embodiment of the present disclosure, wherein (a) is a schematic view of one of the quilting regions R, and (b) is a schematic view of another quilting regions R.

The weighted beads 14 are disposed between the first weighted bead securing layer 13 and the second weighted bead securing layer 15. The first material layer 11, the first weighted bead protection layer 12, the first weighted bead securing layer 13, the weighted beads 14, the second weighted bead securing layer 15, and the second weighted bead protection layer 16 are connected by quilting via first sewing threads and form a plurality of quilting regions R to obtain a first component C1. Each of the quilting regions R contains one or a plurality of the weighted beads 14. In FIG. 2, (a) and (b) are respectively schematic views of two different quilting regions R.

The heating wires 18 are secured to a side, facing towards the second material layer 19, of the heating wire securing layer 17, and the heating wire securing layer 17 where the heating wires 18 are secured and the second material layer 19 are sewn into a second component C2 by second sewing threads.

The first component C1 and the second component C2 are sewn as the blanket body 10 by third sewing threads.

People often use blankets to keep warm while sleeping as well as during living. In order to enhance the warming effect without changing the texture of the warming material, it is necessary to increase the thickness of the blanket, which leads to a decrease in the use comfort and a larger storage space. In order to balance the lightweight and the warming effect, electric blankets have been developed. Electric heating wires are deployed in the electric blanket to achieve an effect of rapidly generating heat and maintaining the heat. The electric blankets are often made thin. Where the electric blanket is too light and thin, sometimes a poor use experience is caused. For example, during use, the electric blanket is easily subject to displacement, failing to better cover the human body.

The above embodiment increases the weight of the electric blanket by adding the weighted beads 14 to the electric blanket, such that the electric blanket is not easily displaced during use and a good covering effect is achieved. In addition, with the weighted beads 14, the electric weighted blanket 100 is in better contact with the human body, and improves the comfort during use.

Further, in the related art, the heating wires 18 of the electric blanket are generally secured on a lowermost layer in a state of being laid flat during use, and the sewing routes of the heating wires 18 are all located on the lowermost layer, and the sewing routes are exposed outside the electric blanket. In this way, the sewing routes are visible from the appearance, but also such a way of exposing the wires easily breaks the sewing routes when being used for a long time. This affects a securing effect of the heating wires 18, not only reduces use comfort of the electric blanket, but also reduces safety since the heating wires 18 need to be powered on during use.

In the embodiment of the present disclosure, the first material layer 11 and the second material layer 19 are two outermost layers of the electric blanket 100, and the heating wires 18 are secured to the heating wire securing layer 17 on an inner side of the second material layer 19, such that sewing routes of the heating wires 18 are invisible from the appearance, and the sewing routes are concealed inside the electric weighted blanket 100. This prevents the sewing routes from being easily scratched by an external hard or sharp object to cause the route to fall off, such that the heating wires 18 are not loosen. This also improves stability and safety of securing the heating wires 18. Further, the heating wire securing layer 17 is further provided with a second material layer 19. The second material layer is in contact with the human body, thereby reducing uneven feeling of the heating wires 18.

Figure 3:
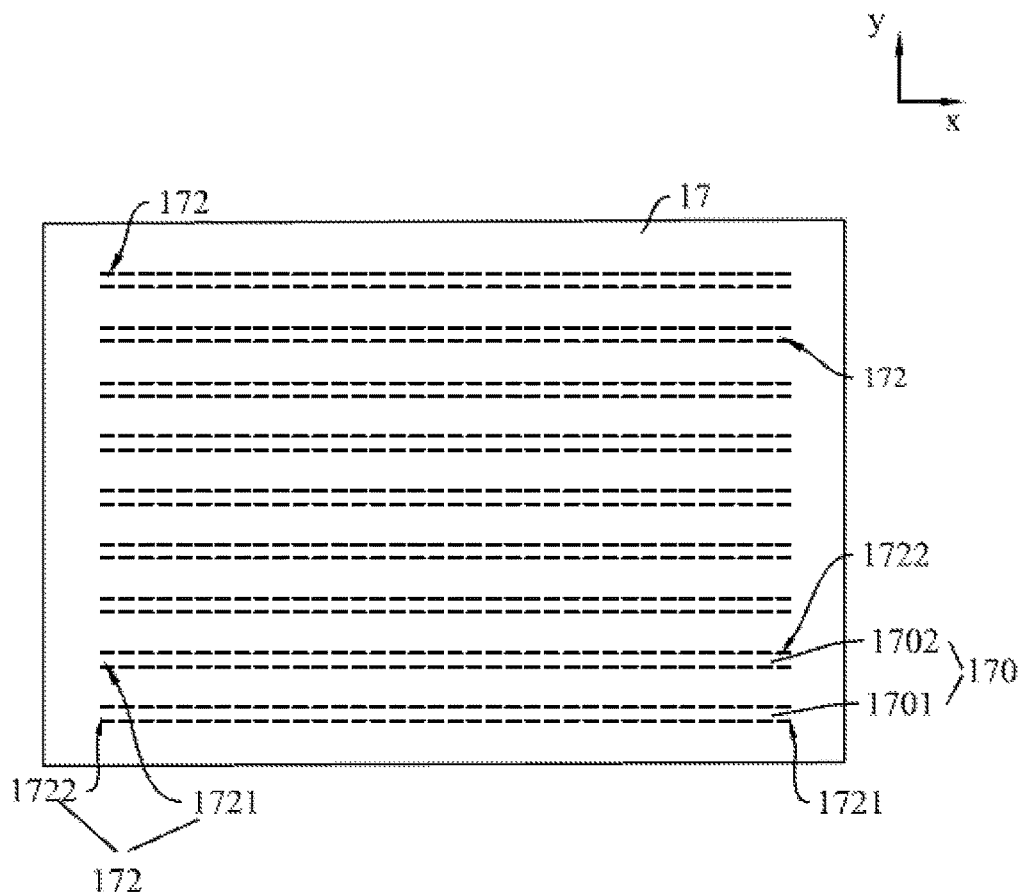
FIG. 3 is a schematic structural view of a heating wire securing layer according to an embodiment of the present disclosure.
Figure 4:
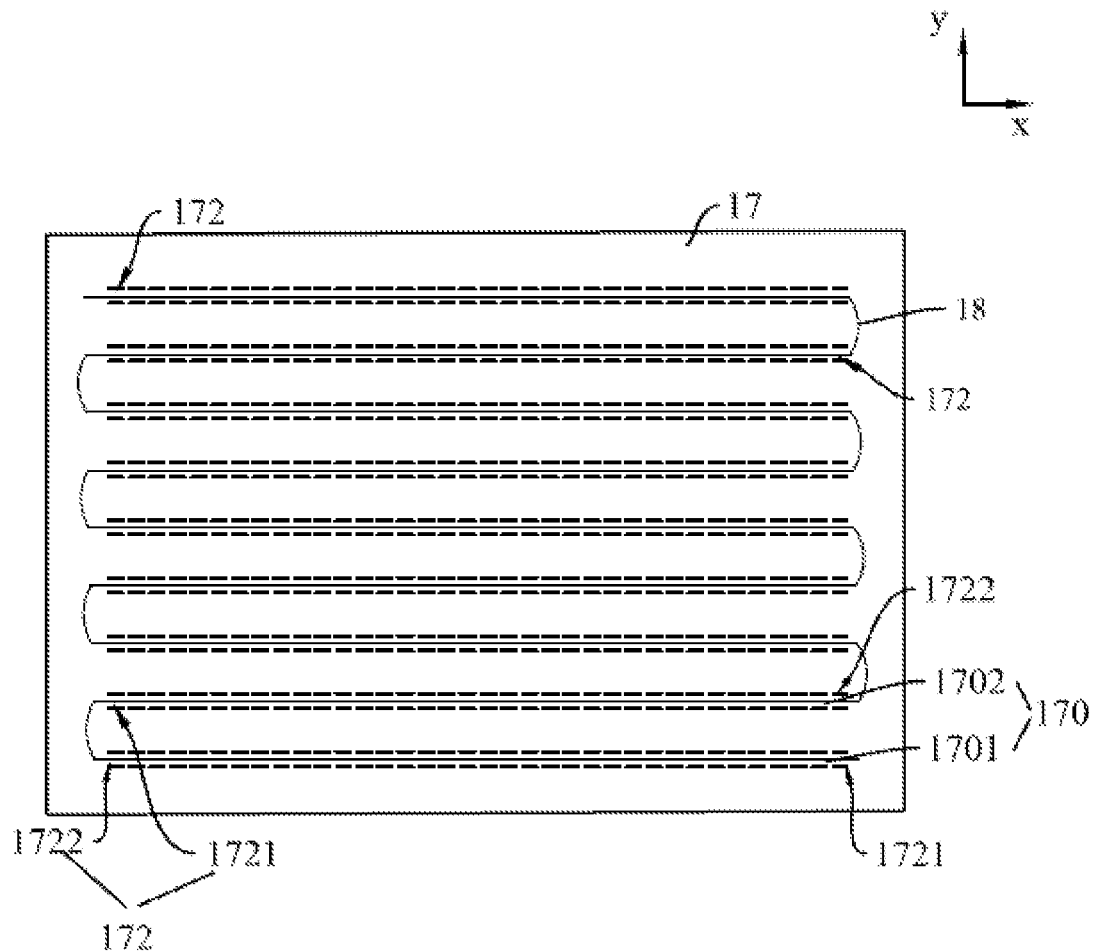
FIG. 4 is a schematic structural view of heating wires routed on the heating wire securing layer according to an embodiment of the present disclosure.

As illustrated in FIG. 3, the heating wire securing layer 17 is provided with wire runways 170. As illustrated in FIG. 3 and FIG. 4, the heating wires 18 are led into the wire runways 170. The wire runways 170 include a plurality of runways that are spaced apart along a first direction y, and the runways are extended along a second direction x. The first direction y is perpendicular to the second direction x. Each of the wire runways 170 is provided with openings 172 at two ends thereof along the second direction x. The openings 172 include a wire inlet 1721 and a wire outlet 1722. In a first wire runway 1701 and a second wire runway 170 that are adjacent, the wire inlet 1721 of the first wire runway 1701 and the wire outlet 1722 of the second wire runway 1702 are disposed on a same side, and the wire outlet 1722 of the first wire runway 1701 and the wire inlet 1721 of the second wire runway 1702 are disposed on a same side. In the case that the heating wires 18 are led into all the wire runways 170, portions, at the wire inlets 1721 and the wire outlets 1722, of the heating wires 18 are bonded to the heating wire securing layer 17.

The first sewing threads, the second sewing threads, and the third sewing threads are partially sewn along a route of an outer periphery of the blanket body 10 of the electric weighted blanket 100. The sewing method along the outer periphery of the blanket body 10 is selvedge sewing, without a quilting route, and has a better appearance. A portion of the first sewing route for forming the quilting region R is located in an inner region of the blanket body 10 instead of the outer periphery.

The heating wire securing layer 17 and the second material layer 19 are made of a flame-retardant material, to isolate the heating wires 18 in the occurrence of sparks. This prevents heating and firing of the whole electric weighted blanket 100, and further improves safety.

The weighted beads 14 include glass beads or ceramic beads. For example, the weighted beads may be glass beads. The structure of the glass beads is compact, and the glass beads are more cleaner and healthier than the ceramic beads made of pottery clay. Weighted beads 14 such as PE beads made of plastic materials tend to melt under high temperatures, and are thus not suitable for the electric weighted blanket 100 according to the embodiments of the present disclosure.

The first weighted bead securing layer 13 has a weight of 50 to 100 gsm (gram/square meter), and the second weighted bead securing layer 15 has a weight of 50 to 100 gsm, which accommodate use requirements of weights of majority users. Where the weighted bead securing layers are too light or too heavy, a poor use experience is caused.

With respect to materials of the material layers, the first material layer 11 may be made of air-permeable lamb fleece, flannel, crystal velvet, or cotton, and the second material layer 19 may be made of air-permeable lamb fleece, flannel, crystal velvet, or cotton. The first weighted bead protection layer 12 may be made of pongee, polyester, or woven fabric, and the second weighted bead protection layer 16 may be made of pongee, polyester, or woven fabric, which both achieve an effect of preventing bead leakage. The first weighted bead securing layer 13 and the second weighted bead securing layer 15 are both made of spray-bonded wadding, which is heavy and weighted. During use, there is no strong feeling of the weighted beads 14, and an effect of preventing bead leakage is achieved. In addition, the spray-bonded wadding is not smooth but rough and exerts a strong friction force. Where the weighted beads 14 rolls into the spray-bonded wadding, a rolling speed of the weighted beads 14 is layerwise reduced by virtue of the spray-bonded wadding exerting the strong friction force, such that stability of the weighted beads 14 is maintained to the greatest extent. The heating wire securing layer 17 may be made of spunlace, nonwoven fabric, or needle punched cotton.

Figure 5:
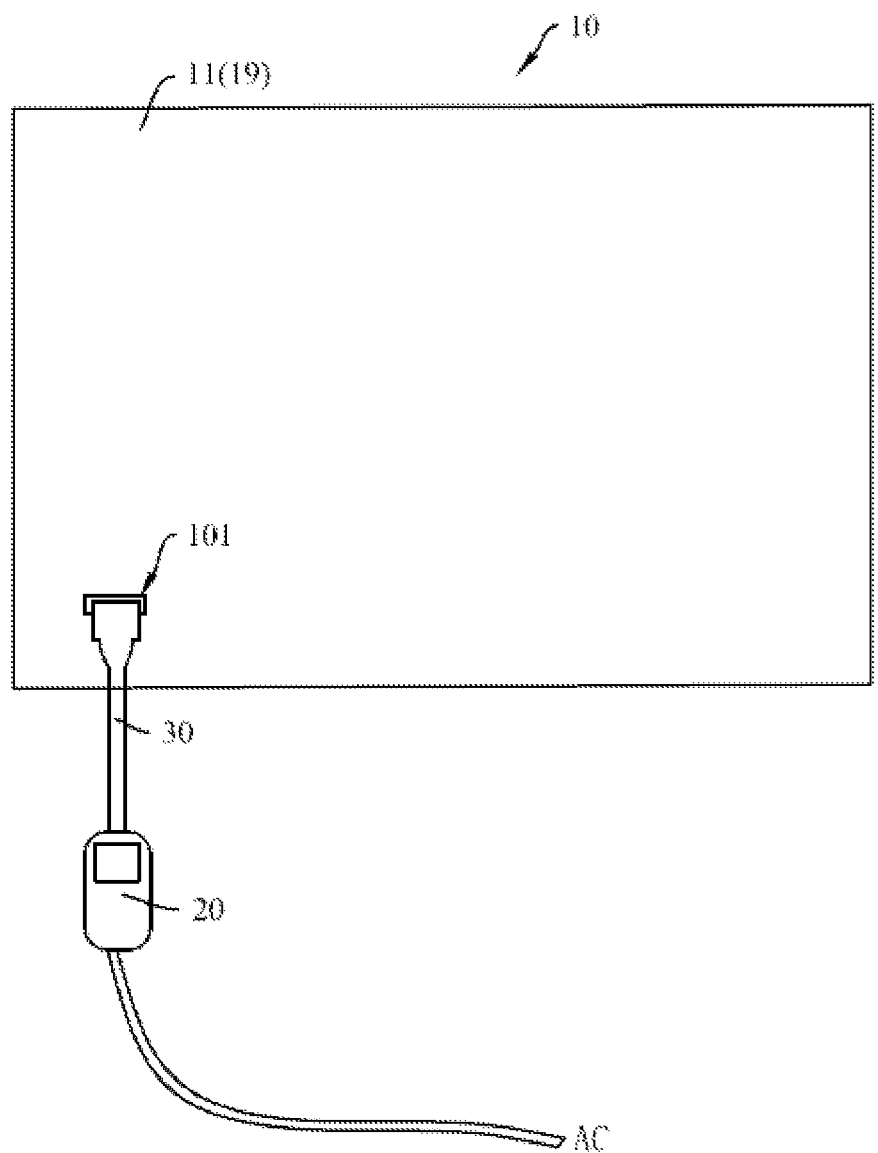
FIG. 5 is a schematic structural view of an electric weighted blanket according to an embodiment of the present disclosure.

As illustrated in FIG. 5, the electric weighted blanket 100 further includes a controller 20 disposed outside the blanket body 10. The controller 20 is connected to a cable 30. The controller 20 is connected to the heating wires via the cable 30, to control the heating wires 18 to operate. A jack 101 is sewn on the first material layer 11 or the second material layer 19. The cable 30 is led through the jack 101 and is connected to the heating wires. The cable 30 is sewn in the blanket body 10 at a position where the cable 30 is adjoined to the jack 101.

Figure 6:
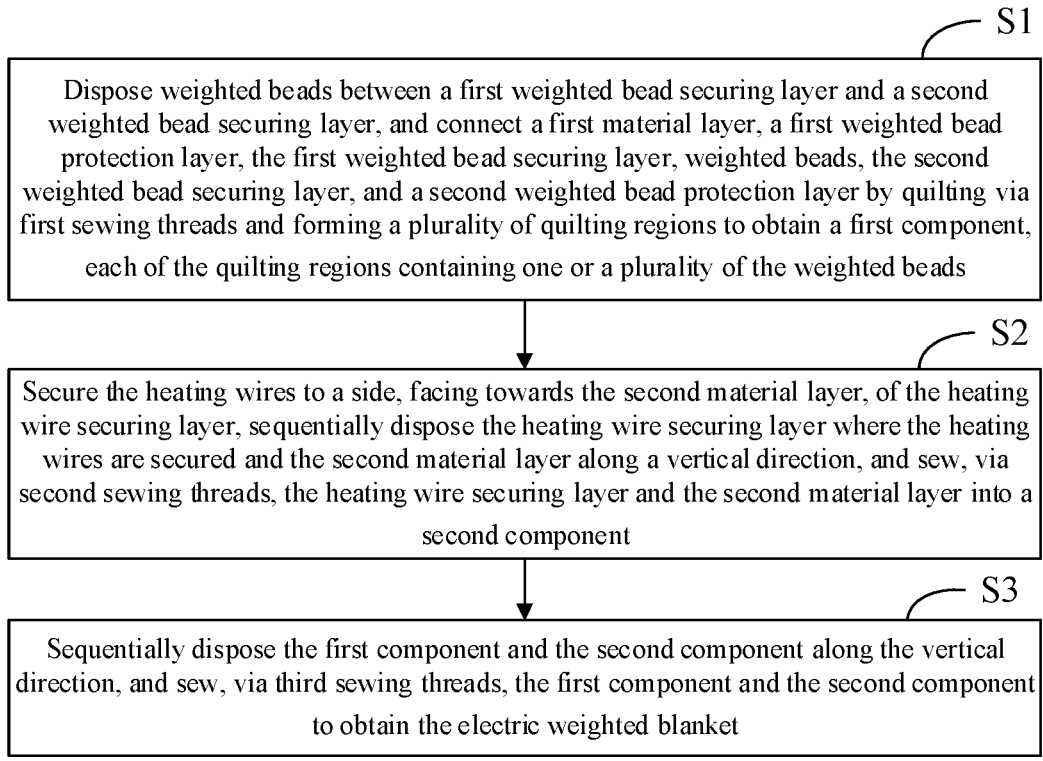
FIG. 6 is a schematic flowchart of a method for manufacturing an electric weighted blanket according to an embodiment of the present disclosure.

A method for manufacturing the electric weighted blanket according to the above embodiment is described hereinafter. As illustrated in FIG. 6, the electric weighted blanket is manufactured by:

S1, disposing weighted beads between a first weighted bead securing layer and a second weighted bead securing layer, and connecting a first material layer, a first weighted bead protection layer, the first weighted bead securing layer, weighted beads, the second weighted bead securing layer, and a second weighted bead protection layer by quilting via first sewing threads and forming a plurality of quilting regions to obtain a first component, each of the quilting regions containing one or a plurality of the weighted beads;

S2, securing the heating wires to a side, facing towards the second material layer, of the heating wire securing layer, sequentially disposing the heating wire securing layer where the heating wires are secured and the second material layer along a vertical direction, and sewing, via second sewing threads, the heating wire securing layer and the second material layer into a second component;

wherein securing the heating wires to the heating wire securing layer specifically includes:

S31, via a wire support rod, leading in the heating wire through the wire inlet of the first wire runway and leading out the heating wire through the wire outlet of the first wire runway; and S32, via the wire support rod, leading in the heating wire through the wire inlet of the second wire runway and leading out the heating wire through the wire outlet of the second wire runway, until the heating wires are led through all the wire runways; and S33, bonding portions, at the wire inlets and the wire outlets, of the heating wires to the heating wire securing layer; and S3, sequentially disposing the first component and the second component along the vertical direction, and sewing, via third sewing threads, the first component and the second component to obtain the electric weighted blanket.

In the above sewing process, the first sewing threads, the second sewing threads, and the third sewing threads are partially sewn along a route of an outer periphery of the blanket body of the electric weighted blanket.

A jack is sewn on the first material layer or the second material layer, and the controller and the blanket body may be connected and assembled by:

S5, leading a cable of a controller through the jack and connecting the controller to the heating wires;

S6, sewing the cable in the electric weighted blanket at a position where the cable is adjoined to the jack.

What is claimed is:

1. An electric weighted blanket, comprising: a blanket body, wherein the blanket body comprises a first material layer, a first weighted bead protection layer, a first weighted bead securing layer, weighted beads, a second weighted bead securing layer, a second weighted bead protection layer, a heating wire securing layer, heating wires, and a second material layer that are sequentially disposed along a vertical direction; wherein the weighted beads are disposed between the first weighted bead securing layer and the second weighted bead securing layer;

the first material layer, the first weighted bead protection layer, the first weighted bead securing layer, the weighted beads, the second weighted bead securing layer, and the second weighted bead protection layer are connected by quilting via first sewing threads and form a plurality of quilting regions to obtain a first component, each of the quilting regions containing one or a plurality of the weighted beads; and the heating wires are secured to a side, facing towards the second material layer, of the heating wire securing layer, and the heating wire securing layer where the heating wires are secured and the second material layer are sewn as a second component via second sewing threads;

wherein the first component and the second component are sewn as the blanket body by third sewing threads.

2. The electric weighted blanket according to claim 1, wherein the heating wire securing layer is provided with wire runways, and the heating wires are routed along the wire runways.

3. The electric weighted blanket according to claim 2, wherein the wire runways comprise a plurality of runways that are spaced apart along a first direction, the runways are extended along a second direction, the first direction being perpendicular to the second direction, and each of the wire runways is provided with openings at two ends thereof along the second direction.

4. The electric weighted blanket according to claim 3, wherein the openings comprise a wire inlet and a wire outlet, and in a first wire runway and a second wire runway that are adjacent, the wire inlet of the first wire runway and the wire outlet of the second wire runway are disposed on a same side, and the wire outlet of the first wire runway and the wire inlet of the second wire runway are disposed on a same side.

5. The electric weighted blanket according to claim 4, wherein portions, at the wire inlets and the wire outlets, of the heating wires are bonded to the heating wire securing layer.

6. The electric weighted blanket according to claim 1, wherein the heating wire securing layer and the second material layer are both made of a flame retardant material.

7. The electric weighted blanket according to claim 1, wherein the weighted beads comprise glass beads or ceramic beads.

8. The electric weighted blanket according to claim 1, wherein the first weighted bead securing layer has a weight of 50 to 100 gsm, and the second weighted bead securing layer has a weight of 50 to 100 gsm.

9. The electric weighted blanket according to claim 1, wherein the first material layer is made of air-permeable lamb fleece, flannel, crystal velvet, or cotton, and the second material layer is made of air-permeable lamb fleece, flannel, crystal velvet, or cotton.

10. The electric weighted blanket according to claim 1, wherein the first weighted bead protection layer is made of pongee, polyester, or woven fabric, and the second weighted bead protection layer is made of pongee, polyester, or woven fabric.

11. The electric weighted blanket according to claim 1, wherein the first weighted bead securing layer and the second weighted bead securing layer are both made of spray-bonded wadding.

12. The electric weighted blanket according to claim 1, wherein the heating wire securing layer is made of spunlace, nonwoven fabric, or needle punched cotton.

13. The electric weighted blanket according to claim 1, further comprising: a controller disposed outside the blanket body, wherein the controller is connected to a cable and is further connected to the heating wires via the cable to control the heating wires to operate, and a jack is sewn on the first material layer or the second material layer, wherein the cable is led through the jack and is connected to the heating wires, and the cable is sewn in the blanket body at a position where the cable is adjoined to the jack.

14. The electric weighted blanket according to claim 1, wherein the first sewing threads, the second sewing threads, and the third sewing threads are partially sewn along a route of an outer periphery of the blanket body of the electric weighted blanket.

15. A method for manufacturing an electric weighted blanket, comprising:
disposing weighted beads between a first weighted bead securing layer and a second weighted bead securing layer, and connecting a first material layer, a first weighted bead protection layer, the first weighted bead securing layer, the weighted beads, the second weighted bead securing layer, and a second weighted bead protection layer by quilting via first sewing threads and forming a plurality of quilting regions to obtain a first component, each of the quilting regions containing one or a plurality of the weighted beads;
securing heating wires to a side, facing towards a second material layer, of a heating wire securing layer, sequentially disposing the heating wire securing layer where the heating wires are secured and the second material layer along a vertical direction, and sewing, via second sewing threads, the heating wire securing layer and the second material layer into a second component; and
sequentially disposing the first component and the second component along the vertical direction, and sewing, via third sewing threads, the first component and the second component to obtain the electric weighted blanket.

16. The method according to claim 15, wherein the heating wire securing layer is provided with wire runways, the wire runways comprise a plurality of runways that are spaced apart along a first direction, the runways are extended along a second direction, the first direction being perpendicular to the second direction, and each of the wire runways is provided with openings at two ends thereof along the second direction; and the openings comprise a wire inlet and a wire outlet, and in a first wire runway and a second wire runway that are adjacent, the wire inlet of the first wire runway and the wire outlet of the second wire runway are disposed on a same side, and the wire outlet of the first wire runway and the wire inlet of the second wire runway are disposed on a same side;
securing the heating wires to the heating wire securing layer comprises:
via a wire support rod, leading in the heating wires through the wire inlet of the first wire runway and leading out the heating wires through the wire outlet of the first wire runway; and
via the wire support rod, leading in the heating wires through the wire inlet of the second wire runway and leading out the heating wires through the wire outlet of the second wire runway, until the heating wires are led through all the wire runways.

17. The method according to claim 16, wherein portions, at the wire inlets and the wire outlets, of the heating wires are bonded to the heating wire securing layer.

18. The method according to claim 15, wherein the heating wire securing layer and the second material layer are both made of a flame retardant material;
the weighted beads comprise glass beads or ceramic beads;
the first weighted bead securing layer has a weight of 50 to 100 gsm, and the second weighted bead securing layer has a weight of 50 to 100 gsm;
the first material layer is made of air-permeable lamb fleece, flannel, crystal velvet, or cotton, and the second material layer is made of air-permeable lamb fleece, flannel, crystal velvet, or cotton;
the first weighted bead protection layer is made of pongee, polyester, or woven fabric, and the second weighted bead protection layer is made of pongee, polyester, or woven fabric;
the first weighted bead securing layer and the second weighted bead securing layer are both made of spray-bonded wadding; and
the heating wire securing layer is made of spunlace, nonwoven fabric, or needle punched cotton.

19. The method according to claim 15, wherein a jack is sewn on the first material layer or the second material layer, and the method further comprises:
leading a cable of a controller through the jack and connecting the controller to the heating wires; and
sewing the cable in the electric weighted blanket at a position where the cable is adjoined to the jack.

20. The method according to claim 15, wherein the first sewing threads, the second sewing threads, and the third sewing threads are partially sewn along a route of an outer periphery of a body of the electric weighted blanket.

* * * * *